United States Patent [19]

Ranade

[11] Patent Number: 4,920,484
[45] Date of Patent: Apr. 24, 1990

[54] MULTIPROCESSOR/MEMORY INTERCONNECTION NETWORK WHEREIN MESSAGES SENT THROUGH THE NETWORK TO THE SAME MEMORY ARE COMBINED

[75] Inventor: Abhiram G. Ranade, Berkeley, Calif.
[73] Assignee: Yale University, New Haven, Conn.
[21] Appl. No.: 253,961
[22] Filed: Oct. 5, 1988
[51] Int. Cl.$^5$ .................. G06R 13/00; H04Q 11/04
[52] U.S. Cl. .................. 364/200; 364/229.4; 364/229.41; 364/251.6; 364/242.94; 340/825.02; 340/825.07; 370/60; 370/94.1
[58] Field of Search ... 364/200 MS File, 900 MS File, 364/200, 900; 370/60, 85, 94, 825.02; 340/825.07, 825.52; 375/4

[56] References Cited

U.S. PATENT DOCUMENTS

| | | | |
|---|---|---|---|
| 4,484,262 | 11/1984 | Sullivan et al. | 364/200 |
| 4,623,966 | 11/1986 | McMillen | 370/60 |
| 4,642,758 | 2/1987 | Teng | 364/200 |
| 4,646,287 | 2/1987 | Larson et al. | 370/60 |
| 4,752,777 | 6/1988 | Franaszek | 340/825.79 |
| 4,799,152 | 1/1989 | Chuang et al. | 364/200 |

OTHER PUBLICATIONS

"How to Emulate Shared Memory", 28th Annual Symposium on Foundations of Computer Science, Oct. 12-14, 1987 Abhiram G. Ranade.
A. Gottlieb, et al., "Coordinating Large Numbers Of Processors", IEEE reprint 0190-3918/81/0000/0341, (1981), pp. 341-349.
A. Gottlieb, et al., "The NYU Ultracomputer-Designing an MIMD Shared Memory Parallel Computer" IEEE Transactions On Computers, vol. C-32 No. 2 (Feb. 1983), pp. 175-188.
J. H. Reif, et al., "A Logarithmic Time Sort For Linear Size Networks", ACM reprint 0-89791-09-9-0/83/004/0010, (1983), pp. 10-16.
G. F. Pfister, et al., "Hot Spot-Contention and Combining in Multistage Interconnection Networks", International Conference On Parallel Processing, (Aug. 20-23, 1985) pp. 790-795.
Pfister, et al., the "IBM Research Parallel Processor Prototype (RP3): Introduction and Architecture." Proceedings of 1985 International Conference on Parallel Processing, pp. 764-771, Aug. 1985.
Sullivan, et al., "A Large Scale, Homogeneous, Fully Distributed Parallel Machine, I." 1977 Computer Arch. Conference, pp. 105-117.
Sullivan et al., "A Large Scale, Homogeneous, Fully Distributed Parallel Machine, II." 1977 Computer Arch. Conference pp. 118-124.

*Primary Examiner*—Jerry Smith
*Assistant Examiner*—James J. Kulbaski
*Attorney, Agent, or Firm*—Perman & Green

[57] ABSTRACT

A method and apparatus is described for enabling efficient, bilateral communications in a network connecting a plurality of target address modules and a plurality of source address generators. The source address generators are enabled to generate requests to target addresses within the target address modules. The function of the network is to forward the requests to the target address modules holding the respective target addresses and to return the replies generated by the target address module to the respective source address generators. The network interconnects the source generators to each target address module and vice versa. The interconnection network includes a plurality of interconnected nodes, each node having M inputs and N outputs (where M may or may not be equal to N) and a processor for carrying out a communication protocol. The protocol comprises each node first placing incoming target addresses from messages appearing on the node's inputs into a queue associated with each respective input. The target addresses of the messages at the head of each queue are examined, and the message is transmitted whose target address bears a predetermined relationship to the other message's target address. The messages are combined in case their target addresses are found to be equal. Additionally, a direction bit queue is provided in which is stored a sequence of bits indicating from which of the M inputs to the node, the transmitted message was received. A "ghost" message is transmitted (which includes the target address of the message transmitted) on the node's other outputs, to notify interconnected nodes of the transmitted target address. In addition, each source address generator periodically generates an "end of stream" message.

16 Claims, 9 Drawing Sheets

SYSTEM MESSAGE FORMAT

| TAG | TYPE | DATA |

TAG = DESTINATION ADDRESS
 = FOR EOS MESSAGE = ∞

TYPE = READ, OR
 WRITE, OR
 GHOST, OR
 END OF STREAM

FIG. 4
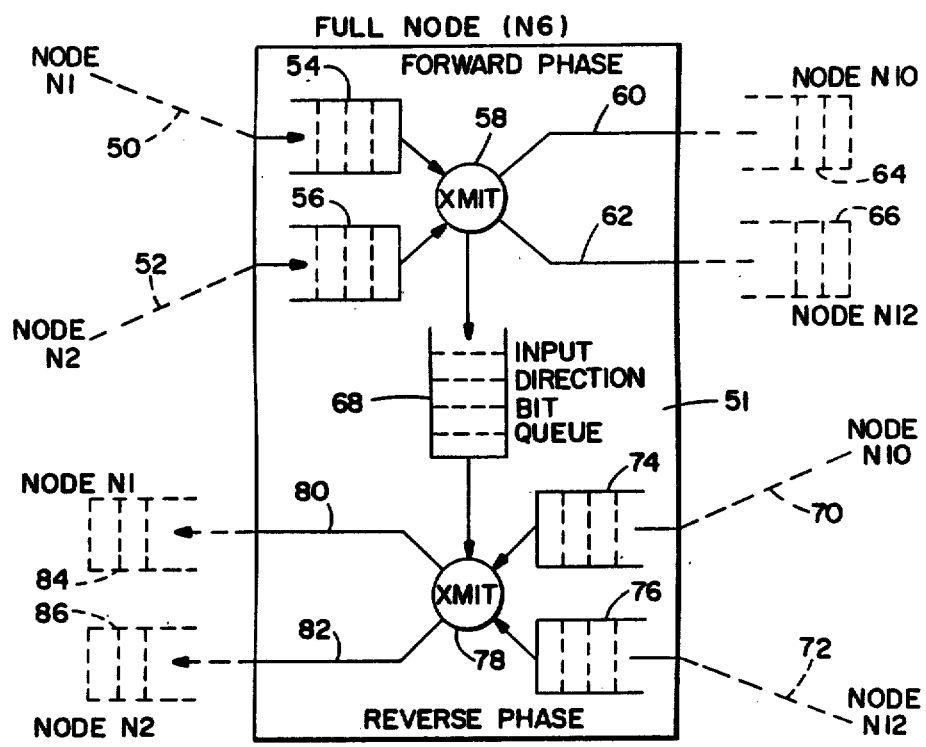
FIG. 5
| TIME | Pa | Pb | Pc |
|---|---|---|---|
| 0 | 10 | 6 | 7 |
| 1 | ∞ | ∞ | ∞ |
| 2 | 15 | 3 | 15 |
| 3 | ∞ | ∞ | ∞ |
FIG. 6a
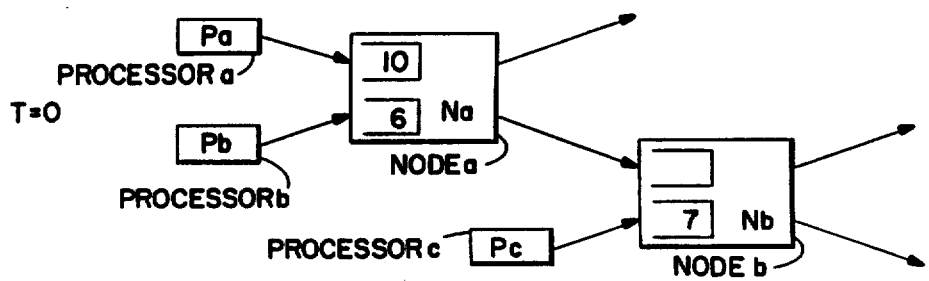

T=1

T=2

T=3

T=4

T=5

FORWARD PHASE NODE ALGORITHM (N6)

REVERSE PHASE NODE ALGORITHM (NI)

FORWARD PHASE NODE ALGORITHM
(WITH OUTPUT DIRECTION BIT QUEUE)

REVERSE PHASE NODE ALGORITHM
(WITH OUTPUT BIT QUEUE)

4,920,484

MULTIPROCESSOR/MEMORY INTERCONNECTION NETWORK WHEREIN MESSAGES SENT THROUGH THE NETWORK TO THE SAME MEMORY ARE COMBINED

This invention was made with Government support under Grant number N00014-86-K-0564 awarded by the Office of Naval Research. The Government has certain rights in the invention.

FIELD OF THE INVENTION

This invention relates to multiprocessor/shared memory intercommunication and, more particularly, to an optimal method for accomplishing such intercommunication in a cost effective manner.

BACKGROUND OF THE INVENTION

In proposed or constructed, highly parallel multiprocessor systems, it is often the case that access to a shared memory is provided by means of a message or packet switched, multi-stage network. In such networks, contention for memory access can create serious bottlenecks. Characteristically, such communication systems do not provide each processor with a direct, dedicated connection to every memory location. It is often necessary for the data in a memory location to be moved over several communication links before it can be delivered to the processor that has requested it. Furthermore, such communication links are, in general, required to operate concurrently. There are three hurdles that must be overcome in such an interconnection network; memory bottlenecks, message traffic bottlenecks and "hot spots".

Memory bottlenecks arise because even though each memory consists of a number of locations, it is often possible to retrieve only one location during each step. If several processors simultaneously need to access different locations stored in a single memory, or memory module, those accesses can only be accomplished sequentially.

Traffic bottlenecks arise because each communication link in the system can transmit only one message at any instant. If several processors need to fetch data over a single link, they can only be transmitted sequentially.

Hot spots arise when a large number of processors need to access concurrently the same memory location within a memory module. Those accesses must not all be allowed to reach the memory module simultaneously because the memory can only service one request at each step.

An interconnection network must provide integrated solutions to these problems. Three of the more promising efforts in this area have been the NYU Ultra Computer, IBM's RP3 and Columbia University's GEM System. Each of these systems propose the use of techniques of "message combining" within the interconnection switch to use its multi-stage nature to help alleviate potential memory access bottlenecks. The NYU Ultra Computer System is described in "The NYU Ultra Computer—Designing a MIMD, Shared Memory Parallel Machine", by Gottlieb et al., IEEE Transactions on Computers, February 1983, pages 175-189. The IBM machine is described in "The IBM Research Parallel Processor Prototype (RP3): Introduction and Architecture", Proceedings of International Conference on Parallel Processing, (1985) pages 764-771. The Columbia machine is described by Sullivan et al. in "a Large Scale Homogeneous, Fully Distributed Parallel Machine" Proceedings of the Fourth Annual Syxposium on Computer Architecture, 1977, at pages 105-124.

Message combining works by detecting the occurrence of memory request messages directed at identical memory locations as they pass through each switch node in the interconnection network. Such messages are then combined, at the switch node, into a single message. The fact that such a combination took place is recorded in a buffer memory resident in each switch node. When the reply to a combined message reaches a node where it was combined, multi replies are generated to satisfy the multi individual requests. This is the message combining protocol described for the NYU Ultra Computer. The IBM scheme is similar while the Columbia/GEM scheme operates somewhat differently, acting more like a cache at each network node. Those systems involve rather complex designs.

Message combining often requires that each node maintain a table which remembers which messages have gone through the node. Additionally, when a message arrives, its destination is compared with all messages which are waiting at the node and identical destination messages are combined. These comparisons take considerable time and require expensive equipment to accomplish the comparison rapidly. Furthermore, it is still possible to miss combinations if messages directed at the same location do not arrive at the same node at the same time. Finally, the reply path distribution is complex (e.g., data returns to requesting processors); involves the use of a table/comparison protocol and extensive and time consuming use of associative memories.

Other solutions have been suggested to solve the hot-spot memory access problem which do not involve the interconnection network. For instance, hot-spots can be avoided if a copy of data to be accessed by a plurality of processors is duplicated in a number of memories. However, this approach requires substantial overhead in deciding which copy of the data is to be read (of the several copies possible) and updating the copies is complex.

Accordingly, it is an object of this invention to provide an optimum interconnection network in a multi processor/memory system.

It is a further object of this invention to provide a node-based interconnection network in a multi processor/memory system which employs message combining but with a minimum of added equipment.

It is still a further object of this invention to provide a node-based, multi processor/memory system interconnection network which provides simple reverse path routing.

SUMMARY OF THE INVENTION

This invention comprises a method and apparatus for enabling efficient, bilateral communications in a network connecting a plurality of target address modules and a plurality of source address generators. The source address generators are enabled to generate requests to target addresses within the target address modules. The function of the network is to forward the requests to the target address modules holding the respective target addresses and to return the replies generated by the target address module to the respective source address generators. The network includes means interconnecting the source generators to each target address module and vice versa. The interconnection network includes a plurality of interconnected nodes, each node having M inputs and N outputs (where M may or may not be equal to N) and means for carrying out a communication protocol. The protocol comprises each node first placing incoming target addresses from messages appearing on the node's inputs into a queue associated with each respective input. The target addresses of the messages at the head of each queue are examined, and the message is transmitted whose target address bears a predetermined relationship to the other message's target address. Means are provided for combining together messages in case their target addresses are found to be equal. Additionally, a direction bit queue is provided in which is stored a sequence of bits indicating from which of the M inputs to the node, the transmitted message was received. Means are further provided for transmitting a "ghost" message (which includes the target address of the message transmitted) on the node's other outputs, to notify interconnected nodes of the transmitted target address. In addition, means are provided for enabling each source address generator to periodically generate an "end of stream" message.

DESCRIPTION OF THE DRAWINGS

FIG. 4 is a functional block diagram of an exemplary full node.

FIG. 5 is a chart which illustrates a message sequence generated by processors Pa, Pb and Pc in FIGS. 6a–6h.

FIG. 6a is a functional block diagram of several nodes which, in combination with FIGS. 6b–6h, shows how message sorting and streaming is accomplished.

DETAILED DESCRIPTION OF THE INVENTION

Figure 1:
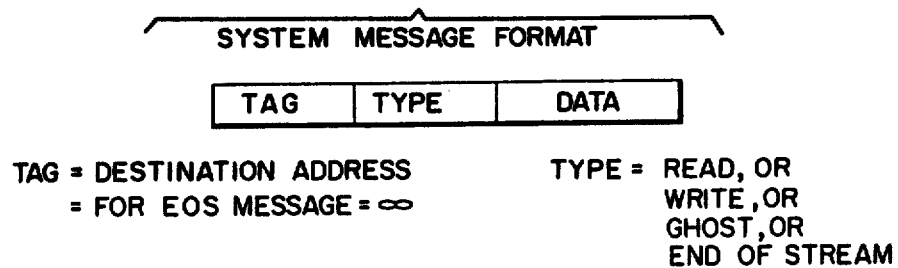
FIG. 1 illustrates the system message formats employed with the invention.

Prior to commencing a description of the structure and operation of the interconnection network of this invention, the message format employed by the system will be described. Referring to FIG. 1, the message format includes areas for three separate data segments, i.e., tag, type and data. The tag area of a message includes the destination address to which the data is being transmitted. The type area defines the operand. In specific, the operand may be either READ, WRITE, GHOST, or END OF STREAM (EOS). A READ command indicates that a processor is requesting that data stored at a tag address be read and returned to the requesting processor. In other words, a READ message requires that a reply message be transmitted in the reverse direction through the network. A WRITE command indicates that data included in the data area of the message is to be written into a memory module at the destination address shown by the tag. No reply message is contemplated to a write command. It should be understood that any command requiring a reply is treated as a READ and any command where no reply is required is treated as a WRITE.

A GHOST in the type area indicates a message which is utilized in the system only for the purpose of keeping message streams sorted, but not for carrying data. In essence, a GHOST message simply notifies a subsequent node of the minimum address to which subsequent messages can be destined. The function and operation of GHOST messages will be described in greater detail hereinbelow.

Finally, an "END OF STREAM" (EOS) message is employed to keep messages moving through the system. Each processor issues an EOS message immediately after it issues a memory access message of the READ or WRITE type. The tag field portion of an EOS message is interpreted as Infinity, and, as will be hereinafter understood, the stream of messages entering and leaving every node are kept sorted by the tag field. It should be understood that the term "Infinity" as used herein, is meant to be equivalent to a number larger than the largest possible memory address and not necessarily equal to the classical "infinity" concept. An EOS message arriving at a node notifies it that no more requests will be issued to it from the corresponding incoming link during a particular cycle.

For the purpose of additional sorting the message types are assigned an arbitrary order as follows: READ=smallest, WRITE=next higher, GHOST =next higher and EOS=highest. This ordering allows messages to be handled in order of relative importance with Read messages being the most important as they require an answer to keep the processors operating.

Figure 2:
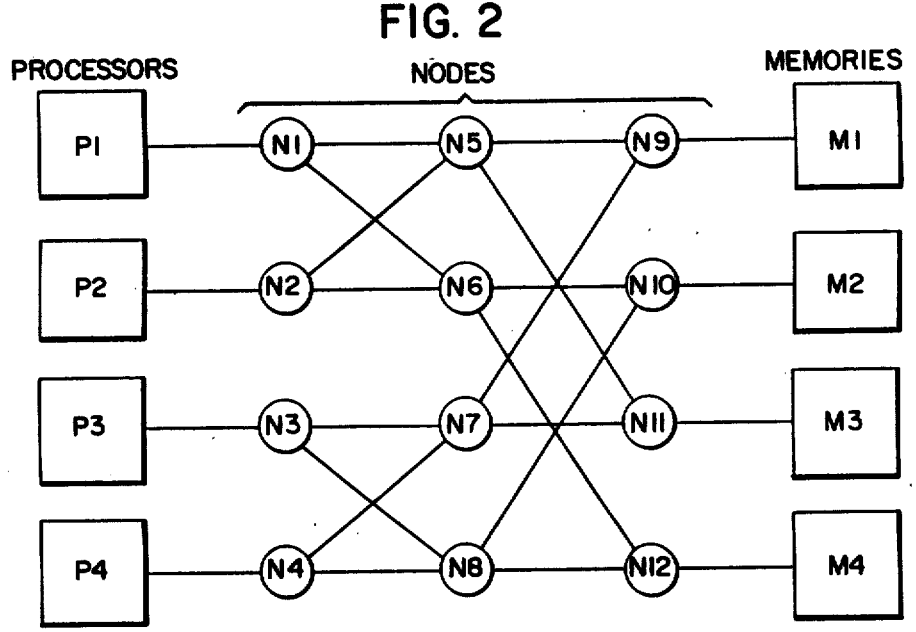
FIG. 2 is a high level block diagram showing a multiplicity of processors, memory modules and the nodal network which interconnects them.

Referring now to FIG. 2, a high level schematic diagram showing a multiprocessor/memory interconnect network is illustrated. Each of processors P1–P4 requires interconnections, at various times during its operation to memory modules M1–M4. The interconnection network, comprising nodes N1–N12, enables any of processors P1–P4 to communicate with any of memory modules M1–M4. The interconnection network shown in FIG. 2 is of the "butterfly" type and is well known in the art. It should be understood however that other types of networks are adaptable to use with this invention. The discussion hereinbelow will be mainly with respect to the operation of one node, N6— which is provided with two inputs and two outputs.

Each node is essentially a two way switch capable of handling message traffic in both directions between processors and memory modules. It should be understood, however, that if more processors and more memory modules are present, the interconnection network may be expanded so that the various nodes will have more than just two inputs and two outputs. While the invention to be described hereinbelow will operate equally well with nodes having greater numbers of inputs and outputs, the description herein will be limited to nodes having two inputs and two outputs. It should be further noted that the number of inputs (M) to a node need not necessarily equal the number of outputs (N).

Briefly stated, each node receives messages from its two incoming input lines and places their tags into corresponding first in/first out queues. At each step, the node compares the tags (destination addresses) of the messages at the head of each queue. The message with the smaller destination address is transmitted along the appropriate outgoing line. If both messages at the head of the queues are destined for the same location, they are combined and only one message is sent out. If only one queue has a message waiting and the other queue is empty, no message is transmitted. To prevent such a message from possibly being "hung-up" in a node, both GHOST and EOS messages are utilized and assure that all messages are appropriately transmitted.

Reply routing occurs as a result of the creation of a direction bit queue at each node. Direction queue bits indicate whether a received message came along the upper input line or the lower input line or along both. Since messages, in this system, are kept sorted by the address of the memory location they initially access, replies at each node return in the same order as the requests that were sent out. Therefore, direction bits are stored in a two-bit wide, first in/first out queue and enable reverse routing to occur simply and rapidly.

Figure 3:
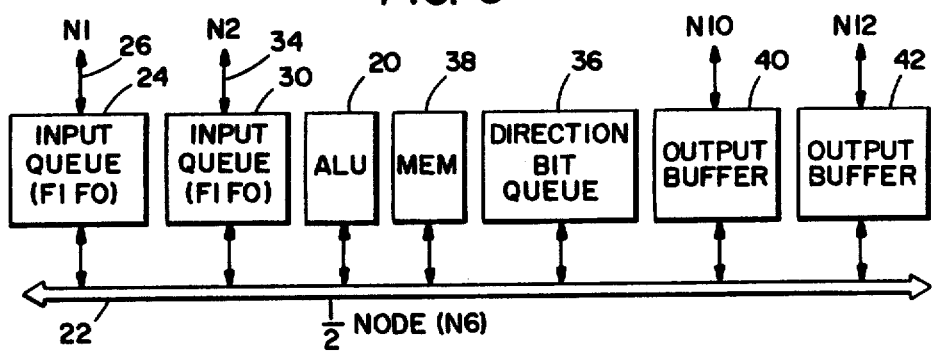
FIG. 3 is a high level block diagram of a one half node constructed in accordance with the invention.

Referring to FIG. 3, a more detailed block diagram of a one half node is shown, it being understood that the other half of a node is substantially identical, but handles traffic in the reverse direction. A node is controlled by an arithmetic logic unit (ALU) 20 which is coupled to a bus 22 which provides intercommunication between all of the components of the node. An input queue 24 is also connected to bus 22 and is adapted, via conductor 26, to receive messages from preceding node (e.g., N1). Input queue 24 is a first in/first out store which receives a message from a preceding node and stores it, on a first in/first out basis along with its tag. Input queue 24 continuously, over conductor 26, keeps the preceding connected node informed as to whether there is room in it for additional messages. If not, the preceding node does not transmit data to input queue 24.

A similar input queue 30 is connected to a further input line 34 which communicates with preceding node N2. The functions of input queue 30 is identical to that previously described for input queue 24 but functions with respect to messages received on line 34.

Direction bit queue 36 is a two bit, fifo memory queue in which is stored pairs of bits indicative of the input line on which each message, which is transmitted from the node, was initially received. Another memory 38 is employed by ALU 20 in the performance of its control and message switching operations. Memory 38, among other data, stores an address map against which the tags of incoming messages are compared. That comparison enables ALU 20 to know where to direct each outgoing message, i.e., whether to node N10 connected to output buffer 40 or to node N12 connected to output buffer 42.

As stated above, FIG. 3 only illustrates one half of a node. The other half is substantially identical except for the fact that its input queues are connected to nodes N10 and N12 and its output buffers are connected to nodes N1 and N2. Obviously, the functions shown in FIG. 3 can be accommodated in a single microprocessor and need not be independent units. Furthermore, ALU 20 and memory 38 can be shared between both halves of a node thereby negating the need for a separate ALU and memory dedicated to reverse direction operations.

Turning to FIG. 4, a functional schematic of a full node (e.g., node N6) is shown. The node comprises forward and reverse phase portions 49 and 51 respectively. Forward phase portion 49 receives inputs on lines 50 and 52 from nodes N1 and N2. Messages appearing on line 50 are recorded in input queue 54 (a first in/first out store). Messages appearing on line 52 are recorded in input queue 56 (also fifo). It will be recalled that the tag portion of a message defines the address to which the message is directed. As soon as messages (and tags) are resident in each of input queues 54 and 56, the node compares the tags; selects the message having a tag with the smaller destination address; searches its address map for an indication of the output line on which to transmit the selected message; and then transmits it on the appropriate output. Thus, transmit function 58 performs those operations and forwards the complete message on either of output lines 60 or 62, depending upon the address map. The message on output line 60 is fed to an input queue 64 in node N10 whereas a message transmitted on line 62 is transmitted to input queue 66 in node N12.

At the time a decision is made on which output line the message is to be transmitted, transmit function 58 also records (in input direction bit queue 68) an indication of the identity of the input line on which the to-be-transmitted message was received, provided the message is of type READ. For instance, if the message arrived on input line 50, a "1" is stored in queue 68; whereas if the message arrived on line 52, a "0" is stored. Input direction bit queue 68 is a fifo queue.

If the message tags appearing at the tops of input queues 54 and 56 are compared and found to be identical, then it is known that both messages are directed to the same address. In such a case, the type portions of the messages are compared to determine if they are identical. If so, the messages are combined and a single message is transmitted onto the selected output line by transmit function 58. In the case where the combined messages are of the READ type, a "01" is inserted into input direction bit queue 68 indicating that the outgoing message was received on both input lines 50 and 52.

If only one input queue has a message waiting (the other queue is empty), no message is sent out. (If such a message were sent, the next message along on another input might conceivably have a smaller target address thus violating the sorting requirements). This problem is, to a major extent, alleviated by the transmission of GHOST messages. When a node has, in one of its input queues, a tag indicating a particular destination, there is no way it can know whether it should transmit the associated message until the node receives another message on its other input line. This problem is solved by creating, at a previous node, a GHOST message. Every time a node readies an actual message for transmission, it also readies a message with identical tags and data sections, but with a type section indicating GHOST. This message is sent out to all the nodes, except the one receiving the actual message. GHOST messages notify a subsequent node of the minimum tag address to which subsequent messages can be destined. Furthermore, if a GHOST message is not immediately transmitted upon arrival at a node, it is discarded (e.g., if no message is present in the other queue). GHOST messages are not used for any other purpose other than to "keep the system going".

Consider, as an example, that input queue 54 has a message at its top end whose tag indicates an address 135. Assume further that there is no message in input queue 56. If it is assumed further that node N2, in a previous cycle, transmitted a message on another of its output lines which message had a tag address of 150, node N2 would have simultaneously placed a GHOST message on line 52 which would now be resident at the top of input queue 56, with the tag showing address 150. Thus, transmit function 58 will know that no message will be received from node 2 with an address tag lower than 150 and can transmit the message corresponding to tag 135. It should be realized that a GHOST message may itself be forwarded by a node if it has a smaller tag than all of the tags at the head of the input queues in the node. If however, the GHOST is not forwarded immediately, then it is not retained. An upstream node will only send the node containing the GHOST, another message (GHOST or otherwise) during the next interval whose tag cannot be smaller.

In addition to GHOST messages, the system employs END OF STREAM (EOS) messages to assure that messages will not "hang up" in a queue and not be transmitted. An EOS message has, in both its tag and data areas indications equivalent to Infinity. Thus, when a node receives an EOS message, any message which remains in an input queue (other than one associated with an EOS message) will automatically be transmitted since it must have a lower tag address. Thus, just as GHOST messages help maintain message movement throughout the interconnection network, EOS messages aid in the sorting of the tag fields so that tags always appear throughout the network in the desired order.

After any processor issues a READ or WRITE request, it automatically issues, subsequent thereto, an EOS message. An EOS message arriving at a node thus notifies the node that no more requests will be issued to it along the corresponding input line in this particular sequence of increasing tag address messages.

The reverse phase portion 51 of a node is similar to forward phase portion 49 with one exception. It does not need to refer to an address map to determine the appropriate output line on which to impress a received message. That information is derived from direction bit queue 68. More specifically, a message may be received from either node N10 or node N12 over lines 70 or 72. The received message is inserted into one of queues 74 or 76 and, assuming that another message is simultaneously present in the other input queue (whether GHOST or real), the message with the smaller tag address is forwarded by transmit function 78 in accordance with the indication at the top of direction bit queue 68. This simple routing can be accomplished because of the fact that reply messages are selected by transmit function 78 in the same order that requests were sent out by transmit function 58. Thus, in accordance with the indications in direction bit queue 68, the reply message is transmitted either on output line 80 to input queue 84 in node N1; or output line 82 to input queue 86 in node N2; or on both lines 80 and 82 to the input queues 84 and 86. If the reply message is transmitted only on one output line, i.e., 80 or 82, a GHOST message with the same tag is simultaneously transmitted on the other line. The sorting of the messages in increasing tag order in the reverse direction, therefore, is caused to operate in the same manner as in the forward direction.

The movement of messages and the sorting thereof will be better understood by referring to FIGS. 5 and 6a–6h. In FIG. 5, it is assumed that processors Pa, Pb, and Pc sequentially issue messages destined for the tag addresses shown in the chart. Thus, at time 0, Pa issues a message with tag address 10, Pb a message destined for tag address 6 and Pc, a message destined for tag address 7. At time 1, each of processors Pa– Pc issue an END OF STREAM message with a tag address of Infinity, etc.

Figure 6B:
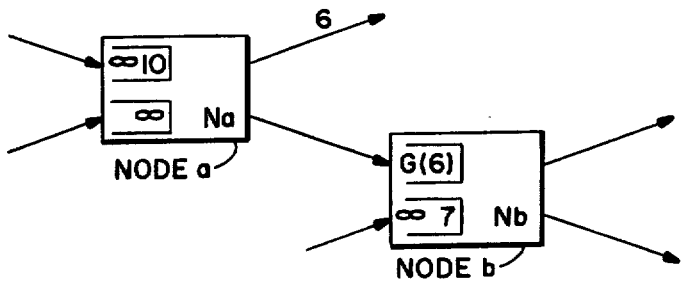
FIG. 6b is a functional block diagram of several nodes which, in combination with FIGS. 6a and 6c–6h shows how message sorting and streaming is accomplished.
Figure 6C:
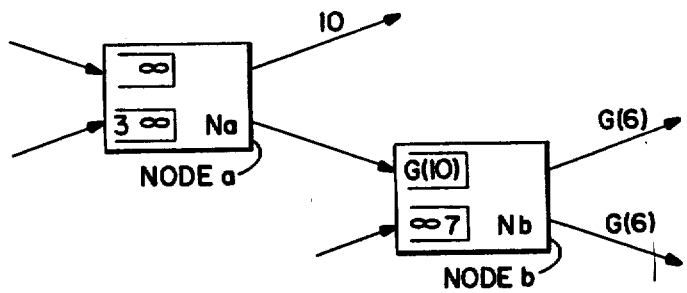
FIG. 6c is a functional block diagram of several nodes which, in combination with FIGS. 6a, 6b and 6d–6h, shows how message sorting and streaming is accomplished.

The schematics shown in FIGS. 6a–6h are "snapshots" of exemplary nodes Na and Nb after the completion of a particular time step. Thus, FIG. 6a shows the state of the input queues of Na and Nb at the termination of time=0; FIG. 6b at the termination of time T1, etc.

In FIG. 6a, Na and Nb have messages with tag addresses 10, 6, and 7 in their respective input queues (the message with the tag equal to 7 in the lower input queue of Nb is not transmitted because the upper queue of Nb is empty). At T=1 (FIG. 6b), Na has transmitted the message with tag 6 as it is the smaller of the message tags resident in its input queues. In addition, it has transmitted a GHOST message (G6) which is now stored in Nb's upper input queue. Further, EOS messages (with Infinity tags) are also stored in the input queues of Na and Nb.

It is assumed, for the purpose of example, that the maximum queue size of Na and Nb is set at two messages. An input queue which contains two messages will therefore cause the respective node to send back an indication that no further messages are to be transmitted until a message in the queue is forwarded.

Figure 6D:
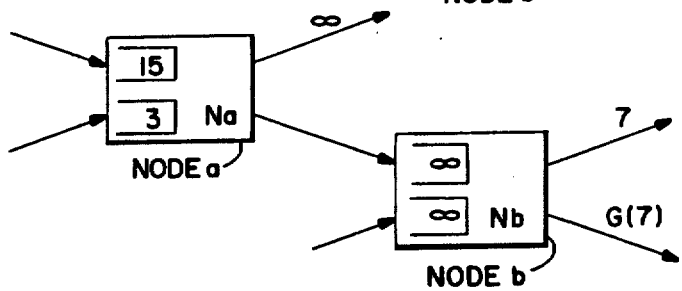
FIG. 6d is a functional block diagram of several nodes which, in combination with FIGS. 6a–6c and 6e–6h, shows how message sorting and streaming is accomplished.
Figure 6E:
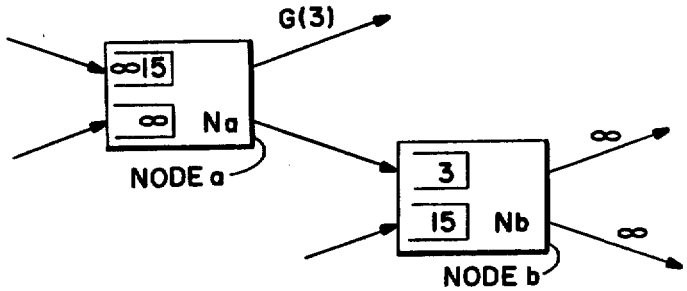
FIG. 6e is a functional block diagram of several nodes which, in combination with FIGS. 6a–6d and 6f–6h shows how message sorting and streaming is accomplished.
Figure 6F:
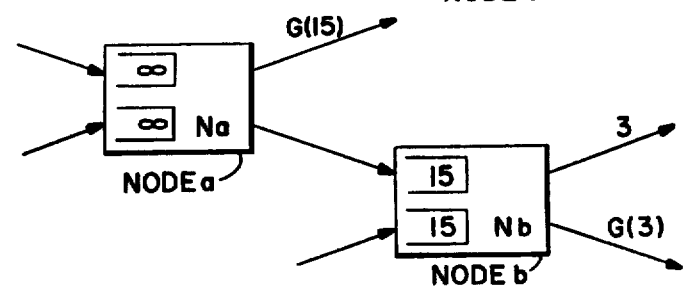
FIG. 6f is a functional block diagram of several nodes which, in combination with FIGS. 6a–6e, 6g and 6h, shows how message sorting and streaming is accomplished.
Figure 6G:
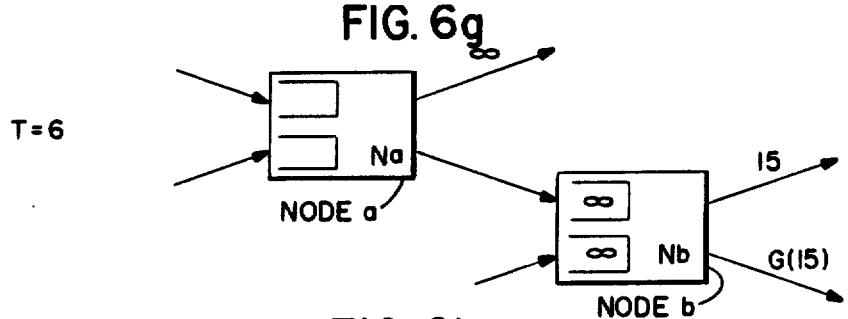
FIG. 6g is a functional block diagram of several nodes which, in combination with FIGS. 6a–6f and 6h shows how message sorting and streaming is accomplished.
Figure 6H:
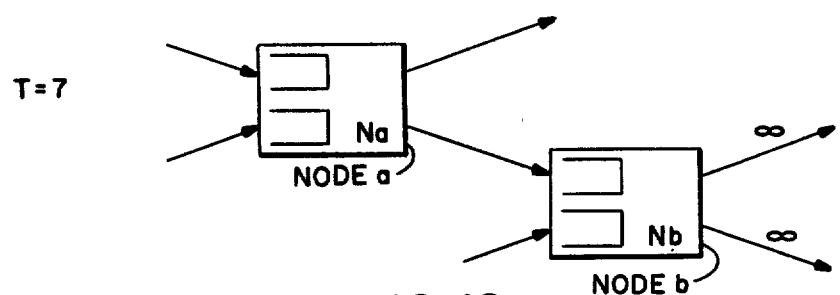
FIG. 6h is a functional block diagram of several nodes, in combination with FIG. 6a–6g shows how message sorting and streaming is accomplished.

At T=2 (FIG. 6c), Na forwards the message bearing tag 10 and Nb forwards GHOST messages on both of its outputs, each with a tag address of 6. Note also that Nb does not accept additional messages from Pc, at this time, because its lower queue is full. It is to be noted that Na now has Infinity tags at the top of both of its queues. The EOS messages along with those tags are transmitted at T=3 (FIG. 6d). At the same time, Nb transmits the message with a tag equal to 7 as well as a corresponding GHOST message and discards the GHOST message (G10) because it cannot immediately be transmitted.

At T=4 (FIG. 6e), the second set of messages begins being transmitted while the first set is still not delivered. Thus, the second set of messages are now resident in the input queues of Na and Nb. At T=5 (FIG. 6f), the message bearing tag 15 is transmitted from Na and the message bearing tag 3 is transmitted from Nb (along with a corresponding GHOST message). At this stage, it is to be noted that messages bearing tag address 15 are resident in both of the input queues of Nb. At T=6 (FIG. 6g), those messages are combined and transmitted along with corresponding GHOST messages. At T=7 (FIG. 6h), the remaining END OF STREAM messages are forwarded and the system continues in operation.

Figure 7:
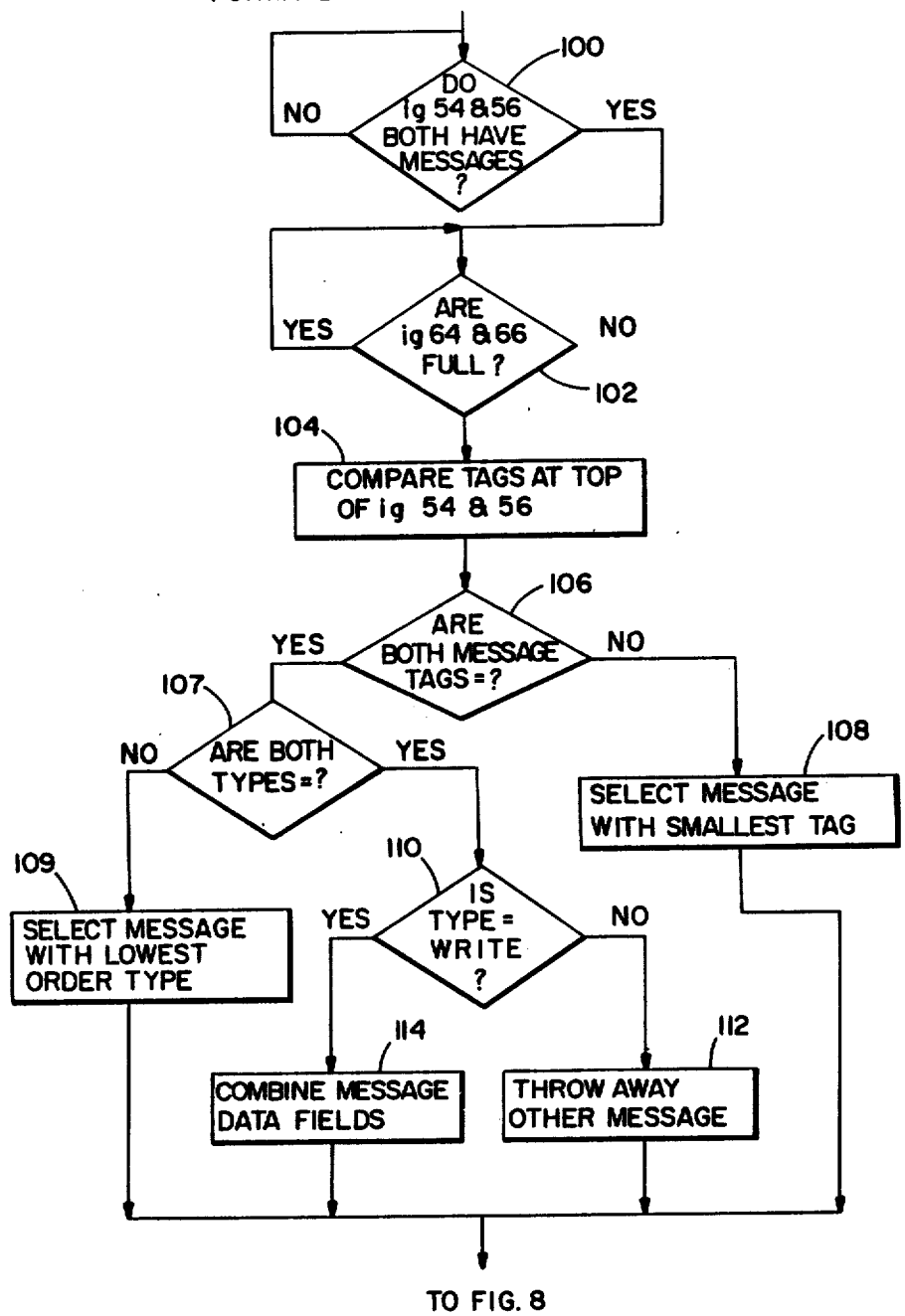
FIGS. 7 and 8 illustrate a flow diagram of the logic employed by a node during forward phase message transfer.
Figure 8:
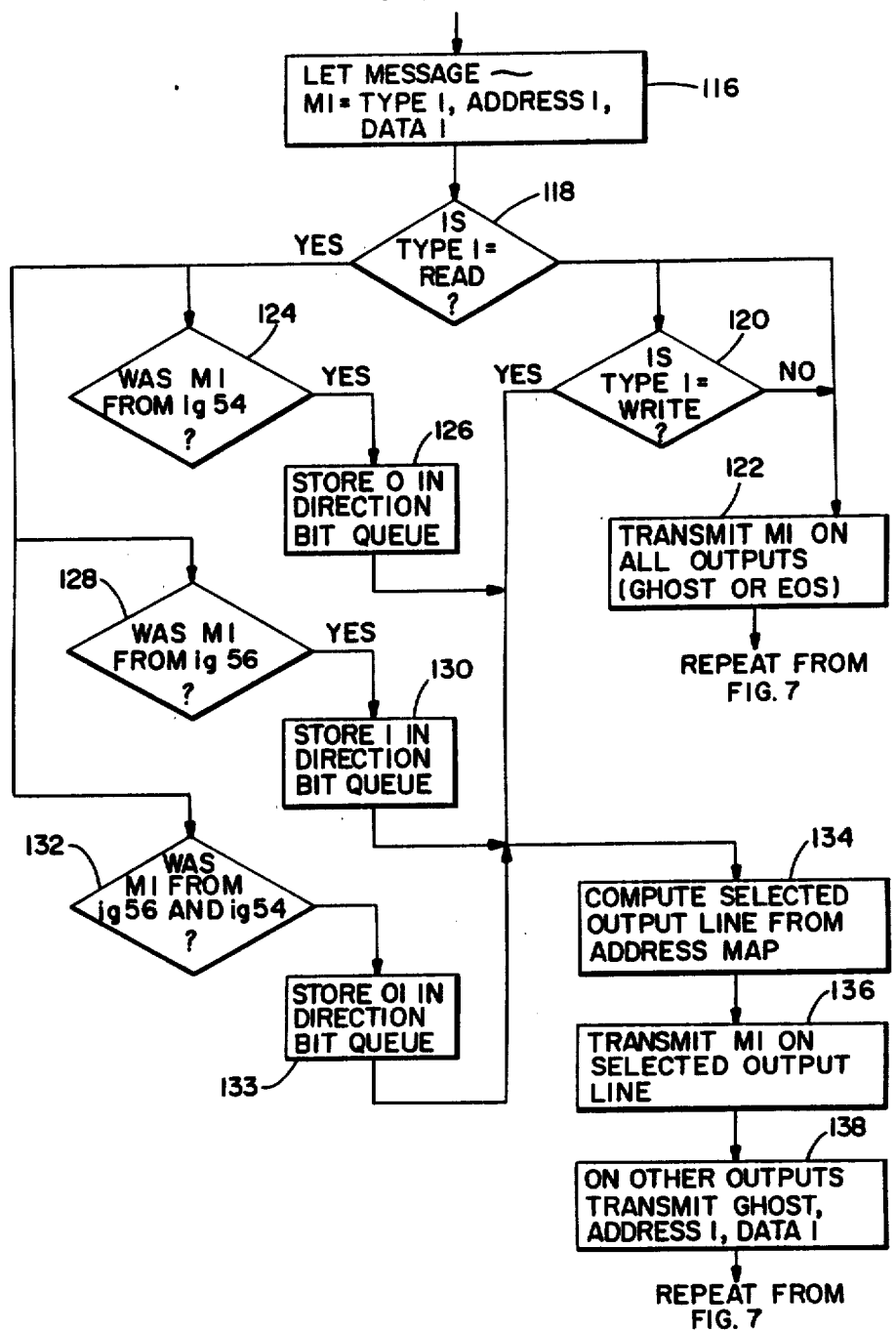
Figure 9:
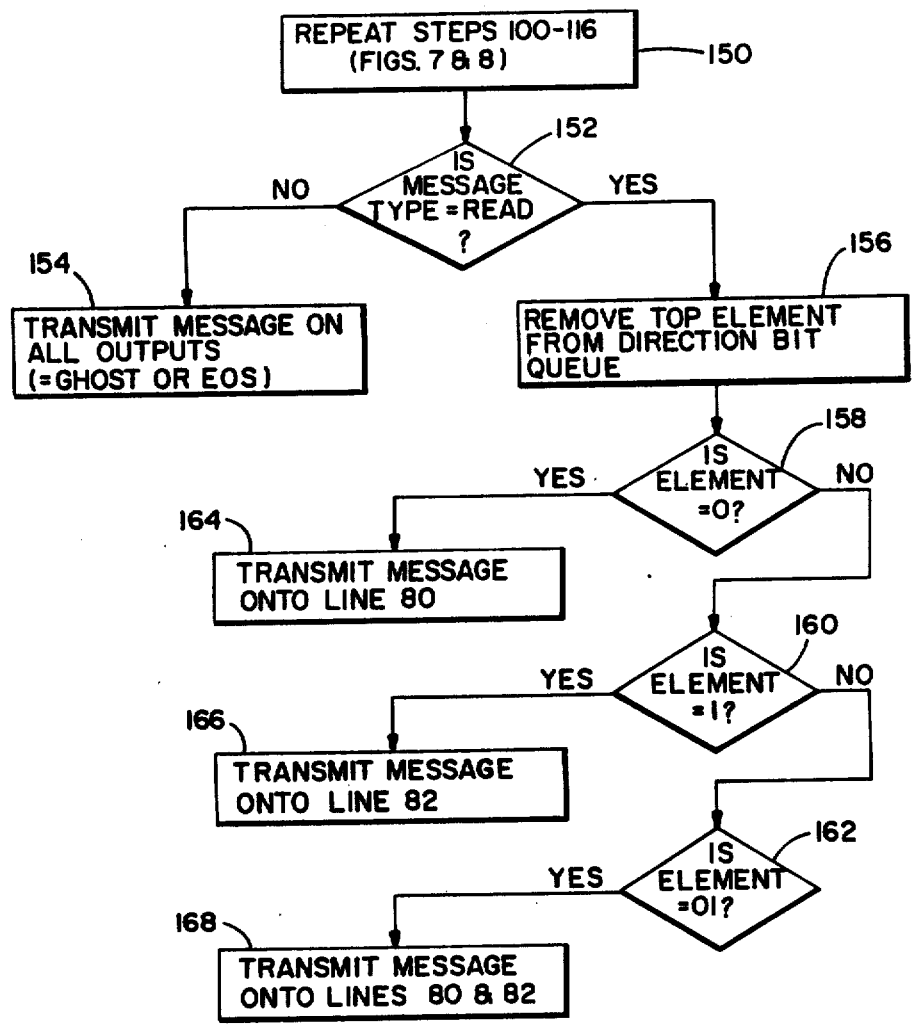
FIG. 9 is a flow diagram which illustrates the algorithm used by a representative node during reverse phase message transfer.

Referring now to FIGS. 7-9, the forward and reverse phase node algorithms will be described as they are performed by a representative node (e.g., N6 in FIG. 1). Initially, the ALU in N6 determines whether input queues 54 and 56 both have messages (decision box 100). If they do not, the cycle is repeated. If they both have messages, then the ALU checks to determine if queues 64 and 66 in N10 and N12 are able to accept messages. If they are both full, the cycle repeats. If they are both able to receive messages (decision box 102), the ALU compares the tags of the messages at the top of input queues 54 and 56 (box 104). As part of this comparison (decision box 106), both messages are compared as to tag and type to determine if they are equal or unequal. If the message tags are unequal, the message with the smallest tag is selected (box 108). If the message tags are equal but the types are unequal (box 107), the lowest order (type) message is selected (box 109).

If both messages are found to be equal as to tag and type, a determination is next made (decision box 110) as to whether the type is a READ or WRITE. If the type is found to be a read, one message is discarded (decision box 112) and the remaining message is designated M1 (box 116). If the type is determined to be a WRITE, then its data is combined with the data field of the other message, (e.g., by addition or multiplication, etc.) and for purposes of explanation, the message is designated M1 (box 116) whose component portions are designated type 1, address 1, and data 1.

At this point, the system examines the type field of message M1 to determine if it is a READ command (decision box 118). If it is found to be a READ command, the system begins to determine what information should be inserted into direction bit queue 68 (FIG. 4). This is accomplished by decision boxes 124, 128 and 132 in FIG. 8. If it is determined that M1 came from input queue 54, a "0" is stored in the direction bit queue (decision box 126); if from input queue 56, a "1" is stored in the direction bit queue; or if from both input queues, a "01" is stored in direction bit queue 56. Thus, it can be seen that during the reverse phase, an examination of the direction bit queue enables a road map to be constructed which indicates the proper direction for transmission of a reply message.

If M1 is found to be other than a READ or WRITE message, (see decision boxes 118 and 120), the message is implicitly either a GHOST or an EOS message and is transmitted on all outputs (box 122).

Assuming M1 is found to be either a READ or WRITE message, the ALU computes its proper output line by an examination of an address map contained within memory (box 134). Message M1 is then transmitted onto the selected output line and on other output lines, a GHOST message is transmitted (box 138) having the same data and tag address as M1. These functions are repeated at each node and enable the system to maintain the messages in an ordered fashion.

A message arriving into a node is handled as follows: each arriving message is stored below the bottom-most message of the corresponding input FIFO queue unless the bottom-most message is a GHOST. If it is a GHOST, then the GHOST is discarded and the incoming message is substituted for it. (The incoming message has, by definition, a tag at least as large as the GHOST's. Since the GHOST is only useful for notifying a node of the minimum tag address that will appear next on an input, the new message substitutes therefor. Otherwise, GHOST messages would clutter up the network).

When a READ message M1 arrives at the addressed memory module, the requested data is accessed, placed in the data field and message M1 is returned in the reverse direction. Referring to FIG. 9, the reverse phase algorithm for N6 is shown. When a return message is received at N6 in either input queue 74 or 76, steps 100-116 are repeated (see FIGS. 7 and 8). Then, the message type is examined (decision box 152) to determine if it is a READ. If not, the message is implicitly determined to be a GHOST or EOS and it is transmitted on all outputs (box 154). Obviously no WRITE messages return from a memory module.

If the message type is determined to be a READ, then the top element from the direction bit queue 68 is removed (box 156), and it is subsequently determined whether that element is a "0", "1", or "01" (decision boxes 158, 160 and 162). Depending upon the detected element, the message is transmitted over line 80, line 82 or on both lines 80 and 82 (boxes 164, 166 and 168).

Figure 10:
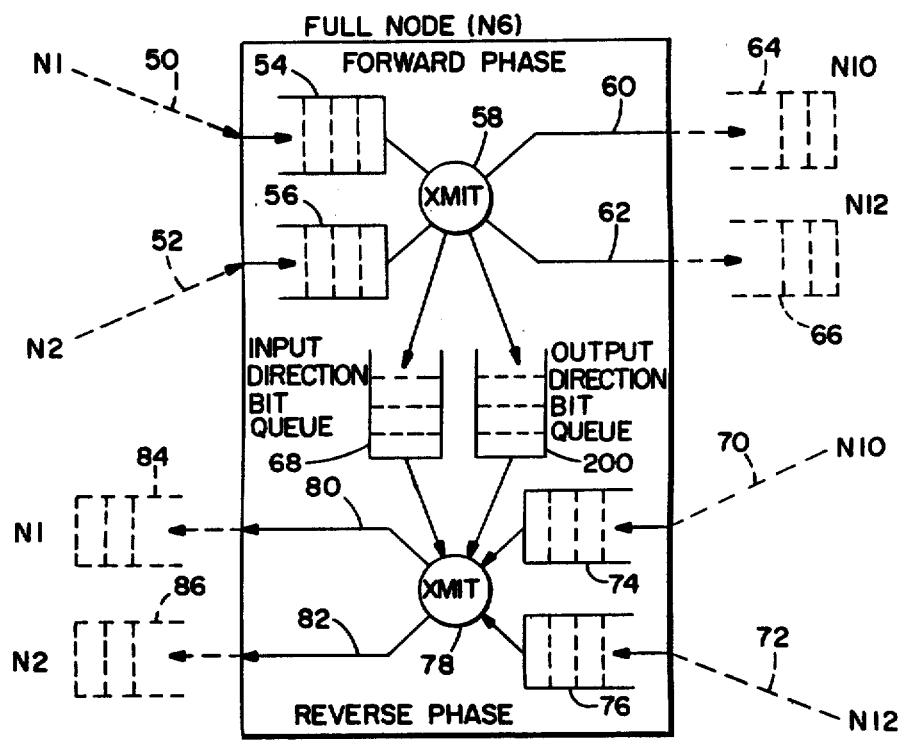
FIG. 10 is a high level functional block diagram illustrating a modification to the nodal structure in accordance with the invention.

Referring to FIG. 10, a modification of the nodal structure is shown which eliminates the requirement for comparison of message tags during the reverse phase. The circuitry shown in FIG. 10 is identical to that shown in FIG. 4 and is similarly numbered, except that an output direction bit queue 200 has been added to the nodal structure. This additional queue, which indicates on what output a message was sent, enables return messages to be automatically routed without any tag comparison being required. Otherwise the operation of the node's circuits are much the same as for the structure shown in FIG. 4.

Figure 11:
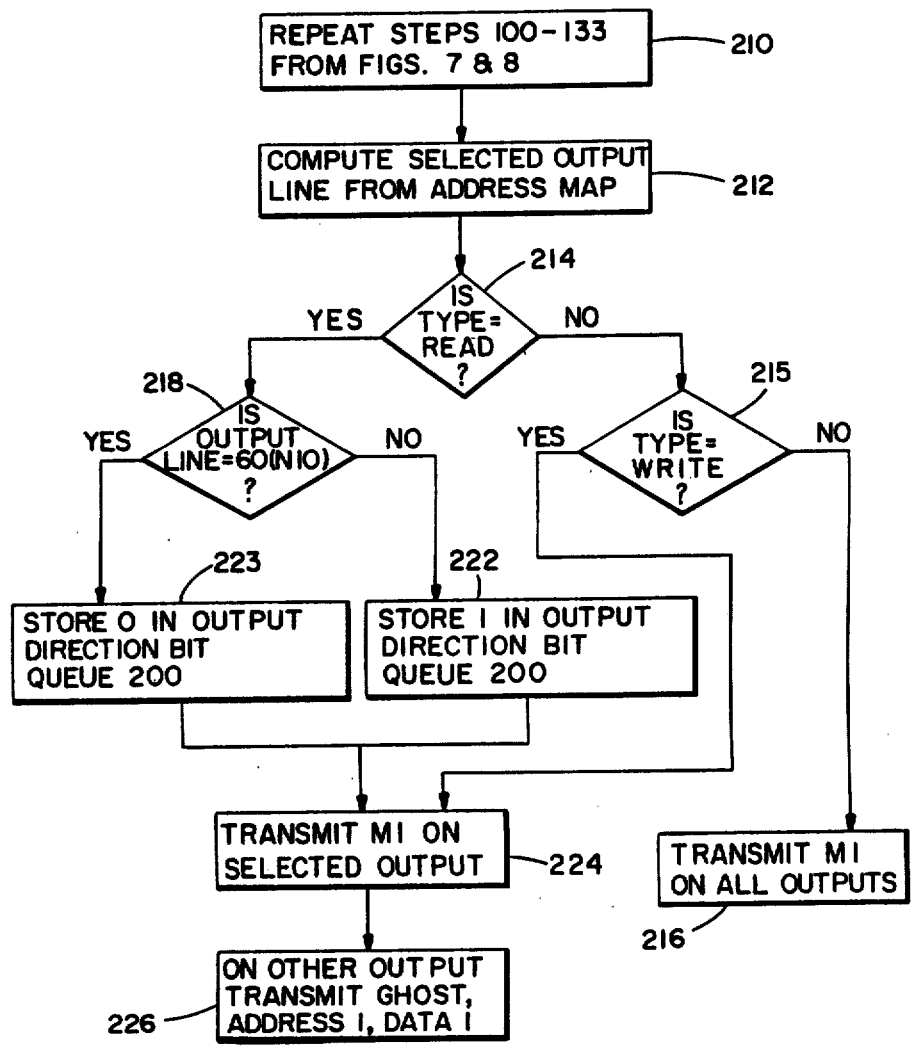
FIG. 11 is a flow diagram illustrating the logic employed by a node during forward phase message transfer in a node as shown in FIG. 10.
Figure 12:
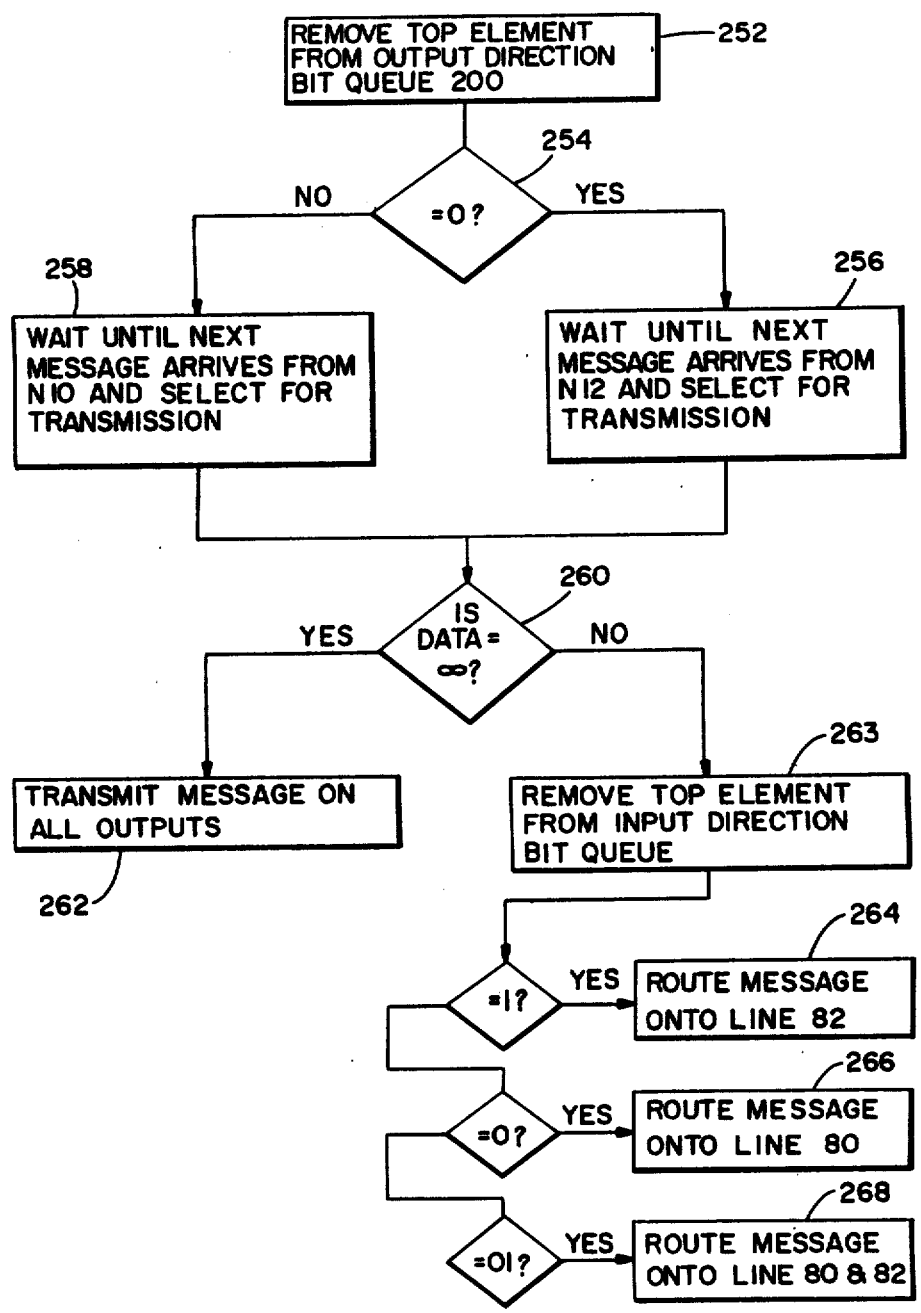
FIG. 12 is a flow diagram showing the logic of the circuit of FIG. 10 during reverse phase message transfer.

This modification will be better understood by reference to the logic flow diagrams of FIGS. 11 and 12. In the forward phase operation, steps 100-133 shown in FIGS. 7 and 8 are repeated (box 210). A selected output line for message M1 is computed from the address map stored within the nodal structure (box 212) and then it is determined whether the message type is a READ (decision box 214). If the message is determined to be a WRITE (box 215), there will be no return message so there is no need to record the particular output line on which the message is emplaced. The WRITE message is transmitted on the selected output (box 224) and a corresponding GHOST message is emplaced on the other output line (box 226). If the message is found to be neither a READ or WRITE, it is transmitted on all outputs as it is either a GHOST or an EOS message (box 216).

If, the message is determined to be a READ, it is clear that a return message will be subsequently be received into the node for retransmission. Thus it will be necessary to know how and where to route the return message. Output direction bit queue 200 eliminates the need to determine which message tag of incoming messages is the smaller. During the forward phase, if the message is to be impressed on output line 60 to N10 (pursuant to an examination of the address map), a "0" is stored in output direction bit queue 200 (see boxes 214 and 218). On the other hand, if the message is emplaced on output line 62 to N12, a "1" is stored in the output direction bit queue 200 (box 218). The message is then transmitted as aforementioned (boxes 224 and 226). Turning now to FIG. 12, the reverse phase operation of the nodal structure shown in FIG. 10 will be considered. Before a message is received, the top element of output direction bits queue 200 is removed (box 252) and its value is determined (decision box 254). If its value is found to be a "0", the node waits until the next message arrives from N10 and that message is immediately selected for transmission (box 258) without any examination of its tag. If its value is found to be equal to "1", (box 256), the node waits until the next message arrives on from N12 and selects that message for transmission.

In either case, the data field is examined to determine if it is equal to Infinity (to determine if it is an EOS message) and if it is found to be so, it is transmitted on both outputs (box 262). If the data field is found to be finite, the top element from input direction bits queue 68 is removed (box 262) and the routing of the message is then determined in accordance with the value found (boxes 262, 266 and 268).

It can thus be seen, that the inclusion of output direction bit queue 200 in the node structure enables only a single field (i.e., data) to be returned from a memory module to a processor, thereby providing additional transmission space for other data.

It is to be understood that the foregoing description is only illustrative of the invention. Various alternatives and modifications can be devised by those skilled in the art without departing from the invention. For instance, while this invention has been described through the use of a message sort algorithm which is based on the selection of equal or lower tag addresses, the sorting scheme could also be constructed around an algorithm which requires the selection of equal or higher tag addresses, or other consistently applied criteria. In such a case, an EOS message would have a tag address of "minus Infinity" rather than Infinity where "minus Infinity" denotes a number smaller than the smallest possible address. Accordingly, the present invention is intended to embrace all such alternatives, modifications and variances which fall within the scope of the appended claims.

What is claimed is:

1. A method for enabling efficient communication in a network between a plurality of target address modules and a plurality of source address generators, said source address generators able to generate target addresses contained within said target address modules, said network including a plurality of interconnected nodes, each node having M inputs and N outputs where M and N are positive integers and M is equal to or greater than 2, each node having queue means coupled to each said input, each said queue means for storing data in a first-in first-out manner, the first-in data in said queue being at a head of said queue, and means for carrying out a communication protocol, said method comprising the steps of:
    placing target addresses from messages received on each said node input into a queue means;
    examining the target addresses at heads of at least two said queue means; and
    transmitting from a node, only when at least two target addresses are present in different queue means, one said message whose target address is found to bear a predetermined relationship to a target address of another said message contained at the head of another said queue means.

2. The invention as recited in claim 1 wherein said transmitted message has a target address numerically smaller than the target address stored in said another queue means.

3. The invention as recited in claim 1 wherein said transmitted message has a target address which is numerically larger than said target address at the head of said another queue means.

4. The invention as recited in claim 1 further including the step of:
    storing in a first direction bit queue means, data defining where said transmitted message was received from.

5. The method as recited in claim 4 wherein said transmitted message is a read request to a target address in a memory module, said memory module responding to said read request by transmitting a reply message, said method further comprising:
    receiving said reply message at a node; and
    transmitting said reply message in accordance with the stored indication at the head of said first direction bit queue means.

6. The invention as defined in claim 4 including the further steps of:
    storing in a second direction bit queue means, data defining where said transmitted message was transmitted to.

7. The invention as defined in claim 6 wherein, in response to an expected reply message from a target address module, the contents of said second direction bit queue means are examined to determine which of said reply messages should be transmitted; and transmitting a reply message in accordance with the stored indication at the head of said first direction bit queue means.

8. The method of claim 1 wherein said examining step further comprises the step of:
    comparing said messages and combining them if they have the same target address.

9. The invention as recited in claim 8 wherein said comparing step combines said messages only if their types and target addresses are identical.

10. The method of claim 8 wherein said method further includes, after said examining step and before said transmitting step, the step of:
    determining from said target address, on which of said outputs said message should be transmitted.

11. The method as recited in claim 1 where N is equal to or greater than 2, which method includes the further step of:
    transmitting a ghost message, with a target address equal to the target address of said transmitted message, on all outputs of said node other than an output on which said transmitted message is emplaced.

12. The method as recited in claim 11 wherein a node, in response to a received ghost message carries out the further steps of:
- receiving said ghost message and inserting the target address associated therewith in an input queue means;
- comparing said ghost target address with a target address of another message stored in another input queue means;
- transmitting said another message only if its target address bears a predetermined relationship to said target address of said ghost message.

13. The invention as recited in claim 12 wherein said predetermined relationship is that the target address of said another message is equal to or less than said target address of said ghost message.

14. The invention as recited in claim 12 wherein said predetermined relationship is that the target address of said another message is equal to or greater than said target address of said ghost message.

15. The invention as recited in claim 1 wherein said method further comprises:
- causing each said source address generator to generate an end of stream message after each read or write message, said end of stream message containing a target address equal to Infinity;
- whereby any node receiving said end of stream message and inserting said target address of Infinity in an input queue means, is caused to transmit a message appearing at the head of another input queue means to a subsequent node.

16. The invention as recited in claim 1 wherein said method further comprises:
- causing each said source address generator to generate an end of stream message after each read or write message, said end of stream message containing a target address equal to "minus Infinity";
- whereby any node receiving said end of stream message and inserting said target address of "minus Infinity" in an input queue means, is caused to transmit a message appearing at the head of another input queue means to a subsequent node.

* * * * *